United States Patent [19]
Fukumine et al.

[11] Patent Number: 5,212,822
[45] Date of Patent: May 18, 1993

[54] METHOD FOR REGISTERING MOBILE STATION IN MOBILE COMMUNICATION SYSTEM

[75] Inventors: Yoshinobu Fukumine; Takanori Utano; Narumi Umeda; Seizo Onoe, all of Kanagawa, Japan

[73] Assignee: Nippon Telegraph and Telephone Corporation, Tokyo, Japan

[21] Appl. No.: 623,670

[22] Filed: Jan. 2, 1991

[30] Foreign Application Priority Data

Aug. 24, 1989 [JP] Japan ................. 1-218058

[51] Int. Cl.$^5$ ............................. H04Q 7/00
[52] U.S. Cl. ................... 455/33.1; 455/33.2; 455/33.4; 455/56.1; 379/60
[58] Field of Search ............. 455/33.1, 33.2, 33.4, 455/54.1, 56.1, 53.1, 34.1; 379/60

[56] References Cited

U.S. PATENT DOCUMENTS

| | | | |
|---|---|---|---|
| 4,876,738 | 10/1989 | Selby | 379/60 |
| 5,101,500 | 3/1992 | Marui | 379/60 |

FOREIGN PATENT DOCUMENTS

| | | | |
|---|---|---|---|
| 0179631 | 7/1988 | Japan | 379/60 |
| 0203025 | 8/1988 | Japan | 455/33.2 |
| 2243976 | 11/1991 | United Kingdom | 455/33.4 |

Primary Examiner—Reinhard J. Eisenzopf
Assistant Examiner—Andrew Faile
Attorney, Agent, or Firm—Armstrong, Westerman, Hattori, McLeland & Naughton

[57] ABSTRACT

Respective location registration areas (A, B, C,) in a mobile communication network include a plurality of base station service areas ($a_1$-$a_n$, $b_1$-$b_n$, $c_1$-$c_n$). By partially overlapping the respective location registration areas, each of the respective base station service areas, for instance, ($b_{23}$, $c_{23}$) belong to a plurality of location registration areas (B, C). The respective base station ($b_{23}$, $c_{23}$) transmits all the location registration codes (B, C) together with one designated primary location registration area code (B) to be selected by a mobile station. The mobile station begins communication after registering the designated area code. When, during communication, the mobile station moves beyond the location registration area boundary, no registration is updated so long as the mobile station stays within communication with a base station transmitting the designated registered area code. When the mobile station moves out of the base station area, the registration code is updated to a new location registration area. Accordingly, the number of location registration updates due to movement of the mobile station near the boundary of location registration areas is decreased in comparison with a conventional method.

6 Claims, 15 Drawing Sheets

LOCATION REGISTRATION AREA IN THE FIRST EMBODIMENT

DIVIDED LOCATION REGISTRATION EREA
IN THE FIRST EMBODIMENT

OPERATION FLOW-CHART IN THE FIRST EMBODIMENT

UPDATE OF LOCATION REGISTRATION IN A PRIOR ART AND FIRST EMBODIMENT

LOCATION REGISTRATION AREA IN SECOND EMBODIMENT

DIVIDED LOCATION REGISTRATION EREA IN SECOND EMBODIMENT

OPERATIONAL FLOW-CHART OF SECOND EMBODIMENT

UPDATE OF LOCATION REGISTRATION IN A PRIOR ART AND SECOND EMBODIMENT

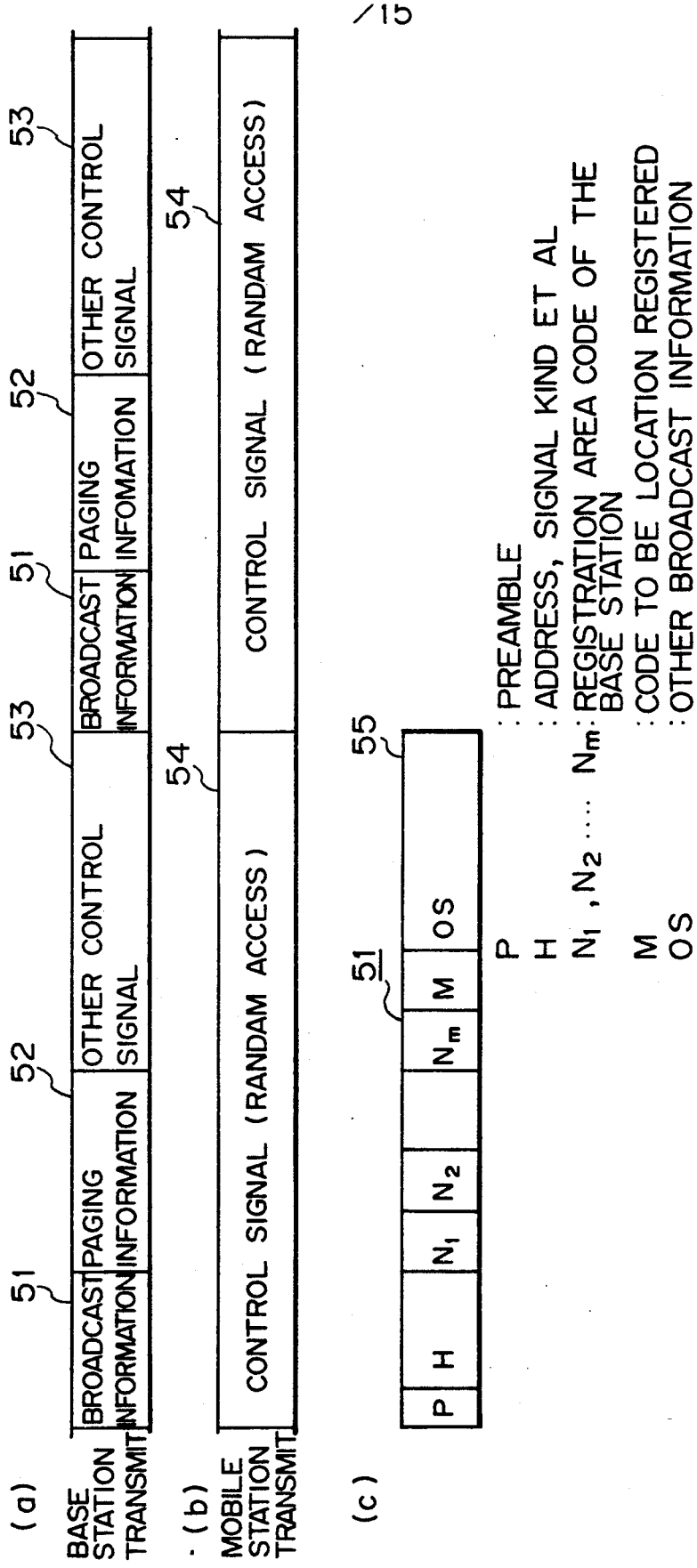

METHOD FOR REGISTERING MOBILE STATION IN MOBILE COMMUNICATION SYSTEM

The present invention relates to a method for registering a mobile station in mobile communication system and, in particular, relates to such a method in which the location of a mobile station is registered based upon broadcast information from a radio base station.

BACKGROUND OF THE INVENTION

In a mobile communication system in which communication between a mobile communication network and a public telephone network is carried out, since subscribers move, there is no fixed exchange for the subscribers, called mobile stations. It is always necessary to follow and register the locations of mobile stations via control stations (in the network) at a higher rank than the radio base stations for determination of route selection, charge index, and a mobile visited area. That is called the location resistration of the mobile stations and a unit area of which the network manages as location information is called location registration area.

The location registration areas of individual mobile stations are registered in a home memory provided at a specific exchange station in the network. Further, for calling from the network side to a mobile station, a plurality of radio base stations simultaneously page all the mobile stations within the location registration area.

FIG. 9 shows a view for explaining one example of a conventional method for location registration of a mobile station. In the drawing, A and B are respectively location registration areas, and are assigned location registration codes LA and LB respectively. Z is a base station zone and there exists a radio base station at the center portion in the zone. A service area consisting of many base station zones Z each including a radio base station is divided into the location registration areas A and B. C shows an area boundary. The location registration codes LA and LB assigned to the location registration areas A and B are advised to mobile stations as broadcast signals by the radio base stations in the location registration areas A and B.

A mobile station compares the above location registration code LA or LB informed by the radio base stations with the location registration code storing by itself. Assuming that the mobile station moves into another location registration area, the comparison would not be successful. Accordingly, when the informed location registration code differs from the location registration code stored by the mobile station, the mobile station registers the informed location registration code to the home memory in the network side, and stores the informed new location registration code in its own memory. Therefore, the location where the mobile station exists and the location registration code (location registration area information) on the home memory coincide to each other.

However, the above conventional method of registering mobile communication locations has a drawback in that the number of location registrations and the traffic for the location registrations increase when a mobile station goes back and forth many times across the boundary C between the location registration areas A and B.

Further, the location registration is always carried out at the radio base stations near the boundary C, making the density of the location registrations high for these boundary stations. Still further, call request signals and location registration request signals are transmitted via the same upward directing control channels with random access so that in the zone at the peripheral of the location registration areas control signal traffic increases and signal collision probability is high. For that reason, the throughput of the control channel is reduced and subscriber capacity per each channel decreases so there arises a drawback which necessitates many control channels.

The present invention intends to overcome the above points, and an object of the present invention is to provide an improved method for registering a mobile station in which the traffic for the location registration in the respective radio zones is reduced, the concentration of the location registration traffic at the peripheral of the location registration area is reduced, and is averaged within the areas, and many subscribers are accomodated.

SUMMARY OF THE INVENTION

The feature of the present invention resides in a method for registering a mobile station in a mobile communication system in which each location registration area (A, B, C) in a mobile communication system contains a plurality of radio base stations and associated radio base station service areas ($a_i$, $b_i$, $c_j$), and a location registration area code transmitted by each radio base station is stored in a mobile station and a home memory coupled with the radio base stations, wherein some radio base stations belong to a plurality of location registration areas by partial overlap of said location registration areas (A, B, C), each radio base station transmits all the registration, area codes to which the radio base station belongs together with the indication of one location registration area code to be selected in a service area of said base station, the mobile station registers the indicated location registration area code, and when the area code registered in the mobile station coincides with none of the plurality of area codes transmitted by the base station, because of movement of the mobile station, the registration of area code for the mobile station is updated to the indicated location registration area code designated by a base station which includes the location of said mobile station in its service area.

BRIEF DESCRIPTION OF THE DRAWINGS

FIGS. 12(a) and 12(b) show is a signal format of a control channel, FIGS. 13A and 13B a block diagram of a base station, and FIG. 14 a block diagram of a mobile station.

THE BEST MODE OF THE INVENTION

Figure 10:
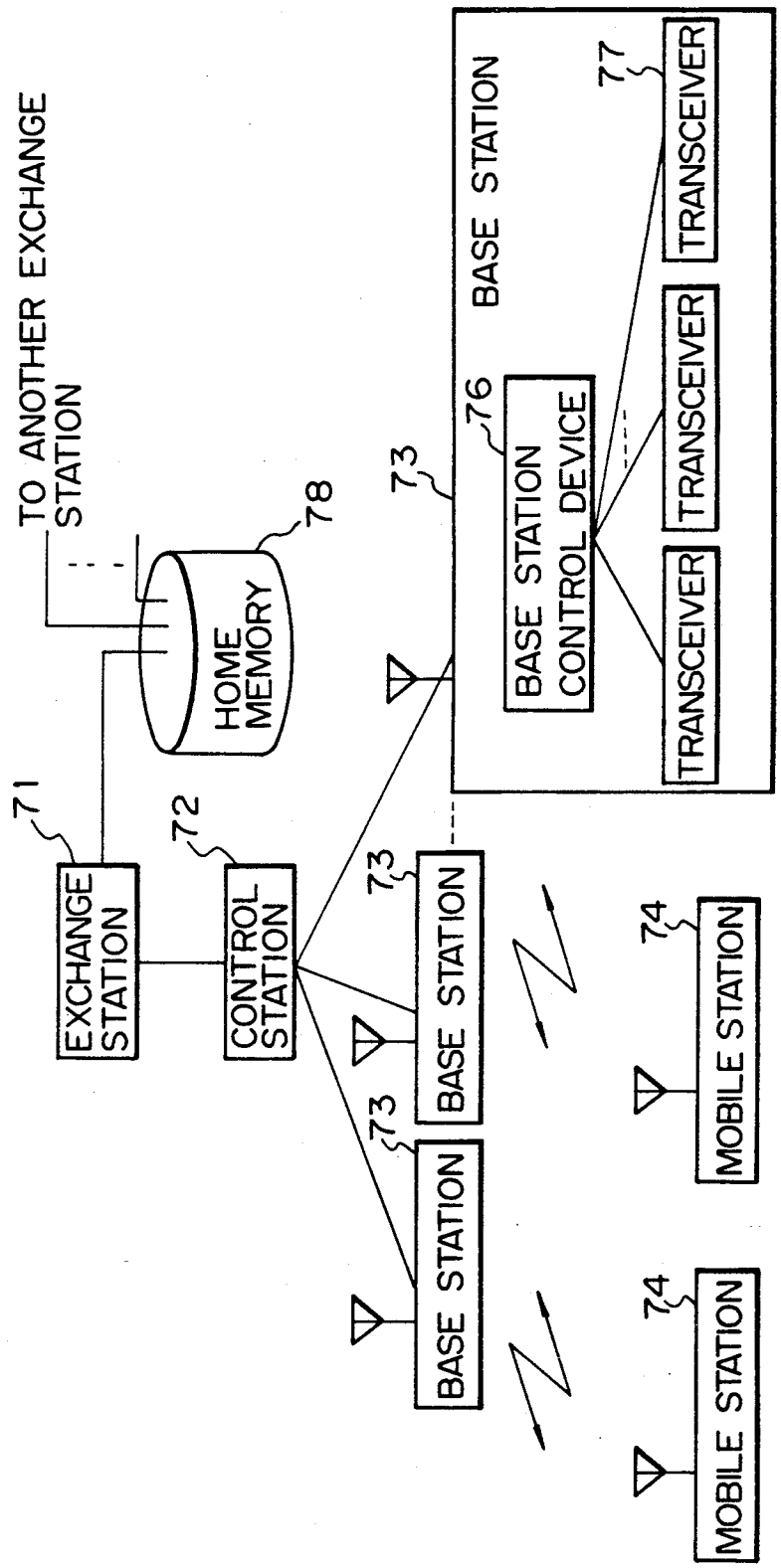
FIG. 10 is a diagram of a communication system to which the present invention is applied.

FIG. 10 shows the mobile communication system to which the present invention is applied. In the figure, the numeral 73 is a base station, 74 is a mobile station, 78 is a home memory. A control station 72 is connected to an exchange station 71. A plurality of base stations 73 are connected to the control station 72. The base station 73 is composed of a base station control device 76 and a plurality of transceivers 77 connected thereto. The home memory 78 is connected to a plurality of exchange stations 71 so as to be accessible thereform, and records subscriber information such as mobile location area codes of the subscribers.

The mobile station 74 communicates with a network via the base station of which service area contains the mobile station. The information to which location registration area the mobile station 74 belongs is stored in the home memory 78 of the network.

When a call to the mobile station 74 is generated in the network, with reference to the home memory 78 it is determined in which location registration area the mobile station is located, and all of the base stations which belong to the determined location registration area transmit the paging information. The mobile station 74, in its wait and receivable state, scans the control channels through which signals of diffrernt frequencies with every base station are transmitted, compares received field strengths, and selects a control channel and a base station in communication. When paging information for the own station is received in a current control channel, communication with the network is effected via the base station relating to said current control channel.

As will be explained in connection with FIG. 11, each base station 73 belongs to a plurality of location registration areas and transmits all of the codes of the location registration areas to which the base station belongs to the mobile station through the control channel. When the location registration area code registered in a mobile station and the home memory coincides with one of the plurality of location registration area codes transmitted from the base station, the mobile station does not update the location registration, however when not coincides with any of the location registration area codes, the mobile station updates the registration of the location registration area code, and rewrites registration of the mobile station itself and the home memory. The selection of one area code out of the plurality of area codes transmitted from the base station is instructed by the base station.

Figure 11:
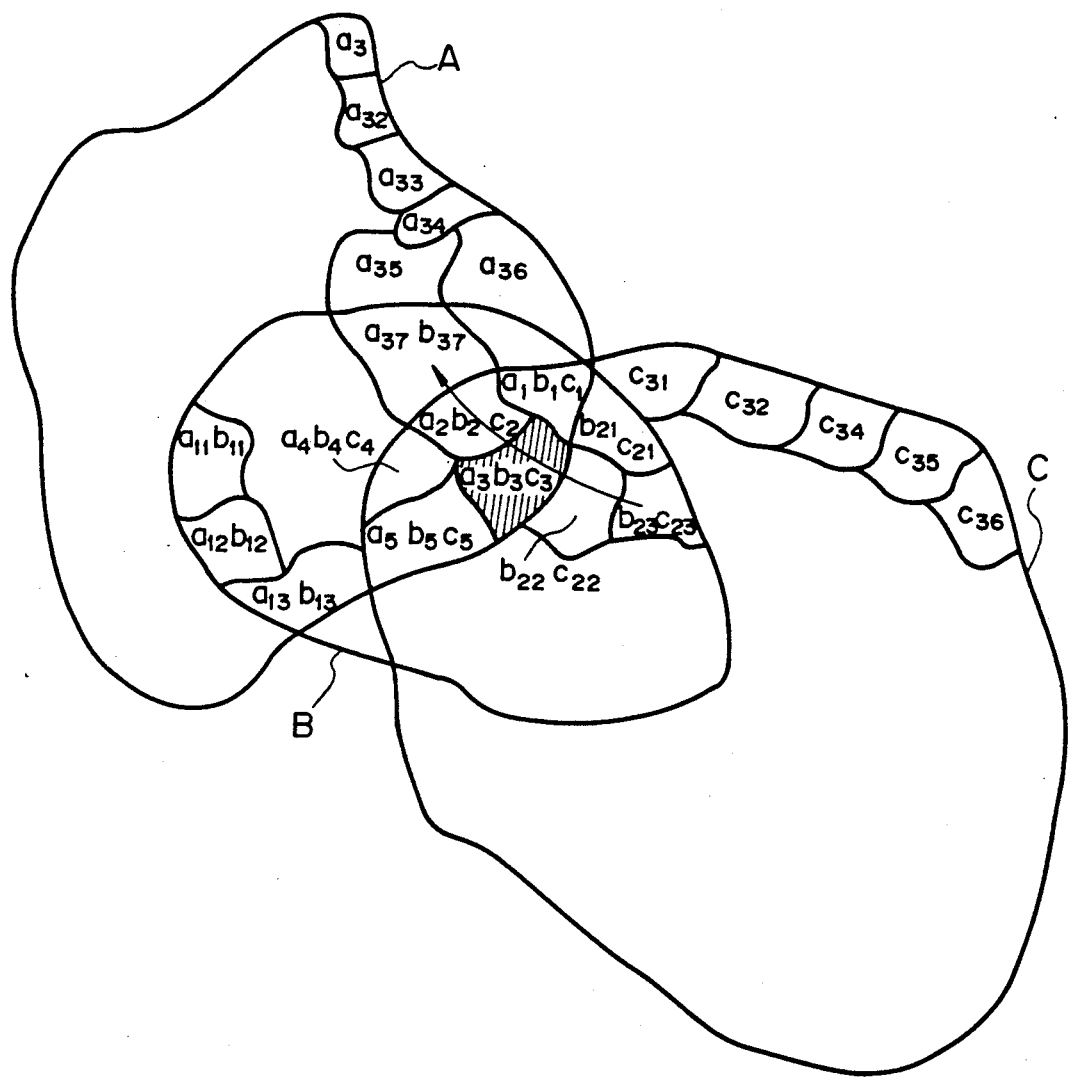
FIG. 11 shows a relationship between the location registration area and the base station service area in the present invention.

FIG. 11 shows the principle of the present invention, A, B, and C show location registration areas and for instance, each area of which has a diameter less than 50-60 Km. Each location area is divided into base station service areas ai, bi, ci, each area of which has a diameter of several Km or less than that. Each base station is provided with a radio transceiver, and communicates with mobile stations located within the corresponding service area.

Each location registration areas A, B and C as illustrated in the drawing partially overlap in their locations. Therefore the overlapped areas belong to a plurality of location areas.

The base station having the hatched service area $a_3$ $b_3$ $c_3$ belongs to three location registration areas A, B, and C.

Each base station transmits all of the codes of the location registration areas to which the base station belong. With regard to the foregoing example, the base station $a_3$ $b_3$ $c_3$ transmits three location registration area codes A, B and C. Another base station $b_{22}$ $c_{22}$ transmits two location registration area codes B and C.

A mobile station, in response to a plurality of location registration area codes transmitted from a base station, selects and registers one location registration area code indicated by the base station so that the mobile station locates around the center of the location registration area. In the foregoing example, for the area of the base station $a_3$ $b_3$ $c_3$ the location registration area B is preferable. For the area of the base station $b_{23}$ $c_{23}$, the location area C is the most preferable.

The designation of a location registration area to be selected by a mobile station is carried out by transmission order, or duplicate transmission of the particular location registration area code. For instance, under the specification that the location registration area code to be selected is transmitted at a specific position, for instant at the beginning or the last in the plurality of the location registration area codes, the base station $a_3$ $b_3$ $c_3$ transmits the location registration area codes A, C, B to place B at the last. Further, under the specification that the location registration area code to be selected is transmitted twice, the base station $a_3$ $b_3$ $c_3$ transmits the location registration area codes as A, B, C, B to repeat B.

By selecting the last or the repeated location registration area code out of the plurality of location registration codes, the mobile station is located and registered at almost the center of a location registration area.

When a mobile station with a location registeration moves across a boundary of a location registration area during communication, and one of a plurality of location registration area codes transmitted by the base station in the moved location coincide with the registered area code, the registration of the area code is not updated. On the other hand, when none of the area codes coincide with the registered area code, the mobile station registeres a new area code.

For instance, when the mobile station at first located in the area $b_{23}$ $c_{23}$, the mobile station is registered at the location registration area C (B is not registered since the area $b_{23}$ $c_{23}$ is in the periphery of area B). When the mobile station registered in the area C moves into the area $a_3$ $b_3$ $c_3$ crossing the boundary with the location registration area A, the location registration is not updated since the area is still in the range of the location registration area C. When the mobile station further moves into the area $a_{37}$ $b_{37}$ beyond the boundary of the location registration area C (wherein area codes A and B are transmitted), the registered area code C does not coincide with any of the codes A and B, the location registration is updated. The location registration code renewed at this moment is A (B is not registered because the area is $a_{37}$ $b_{37}$ the periphery of the area B).

As explained above, through the overlapping of the location registration areas, the number of location registration or update following the movement of a mobile station is reduced.

Figure 1:
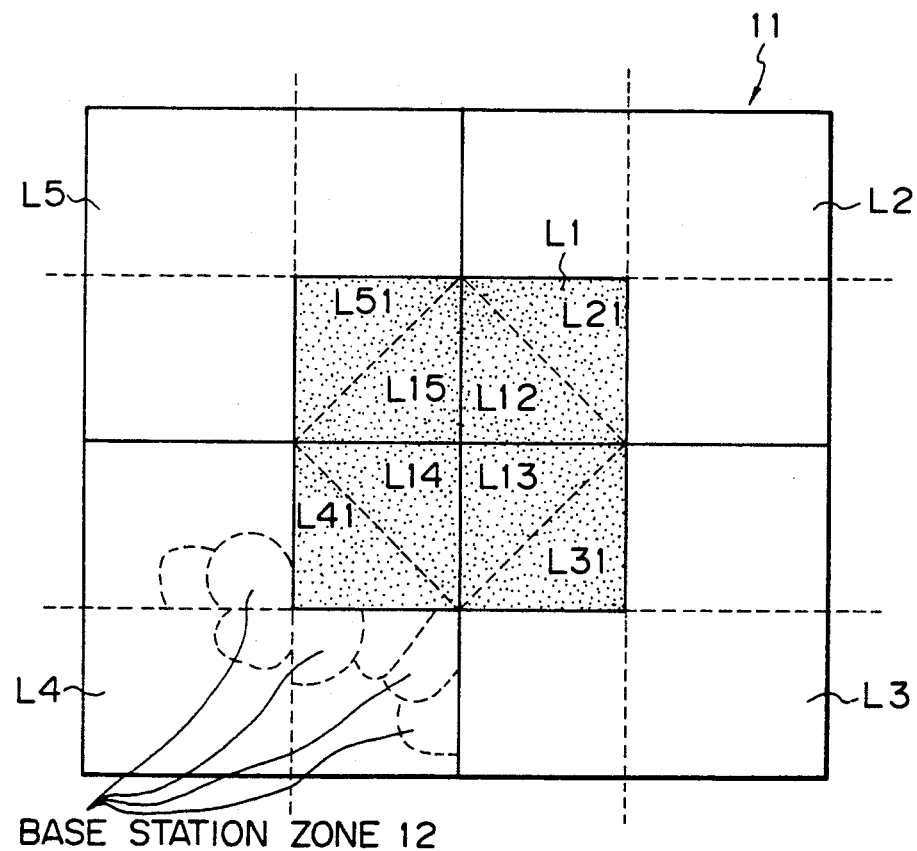
FIG. 1 shows a location registration area of the first embodiment according to the present invention.

FIG. 1 shows location registration area of the first embodiment according to the present invention. In the drawing, 11 is a service area, and is composed of many base station zones 12. The service area 11 is divided by one location registration area L1 and four location registration areas L2–L5, overlapping with L1.

Figure 2A:
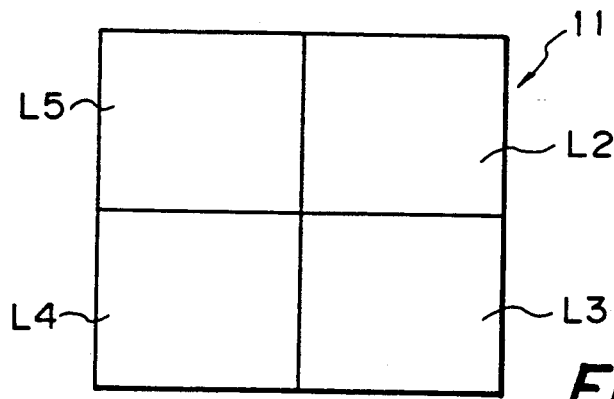
FIGS. 2(a), 2(b), and 2(c) show the location registration area of the first embodiment by divided forms.
Figure 2B:
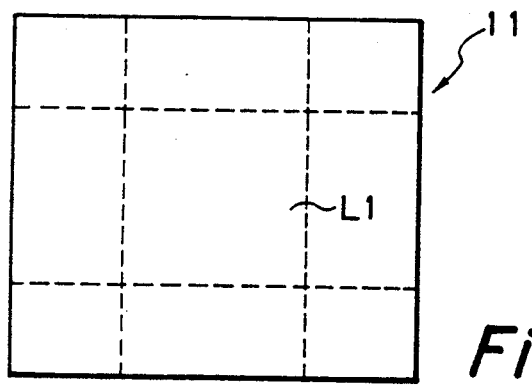
Figure 2C:
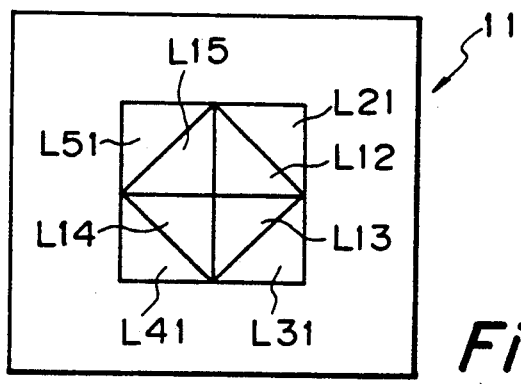

Namely, the service area 11 comprises the first divided location registration group in which the service area 11 is divided into four location registration areas L2–L5 as shown in FIG. 2 (A), and a second divided location registration group in which the dividing position of the same service area 11 is shifted from the first divided location registration area group so as to locate the location registration area L1 having, for example, the same size as the respective location registration areas L2–L5 at the center as shown in FIG. 2 (B), and these two groups are overlapped.

As shown in FIG. 2 (C), there are produced at least eight overlapped location registration areas L21, L12, L13, L31, L14, L41, L15, L51 within the service area 11, in which the location registration areas L2–L5 and L1 in the above first and second divided location registration area groups overlap.

In the present embodiment, each radio base station locating in these location registration areas are respectively assigned two location registration codes as shown in the following Table.

TABLE 1

| Overlapped area | Location registration code of overlapped area | |
|---|---|---|
| | First code | Second code |
| L21 | L2 | L1 |
| L12 | L1 | L2 |
| L31 | L3 | L1 |
| L13 | L1 | L3 |
| L41 | L4 | L1 |
| L14 | L1 | L4 |
| L51 | L5 | L1 |
| L15 | L1 | L5 |

Wherein, the first code + the second code = the location registration code of the overlapped area.

The first code is the location registration code of a location registration area near the center of the overlapped area.

The second code is the location registration code of another location registration area which is overlapped with the location registration area with the first location registration code.

In this manner of assigning the location registration code, each base station is assigned a location registration code of a location registration area near the center portion of the area as the first code. Thereby, a mobile station is location-registered so as to locate at the center portion in the area, in that the mobile station is location-resistered at the location registration area represented by the first location registration code.

Figure 3:
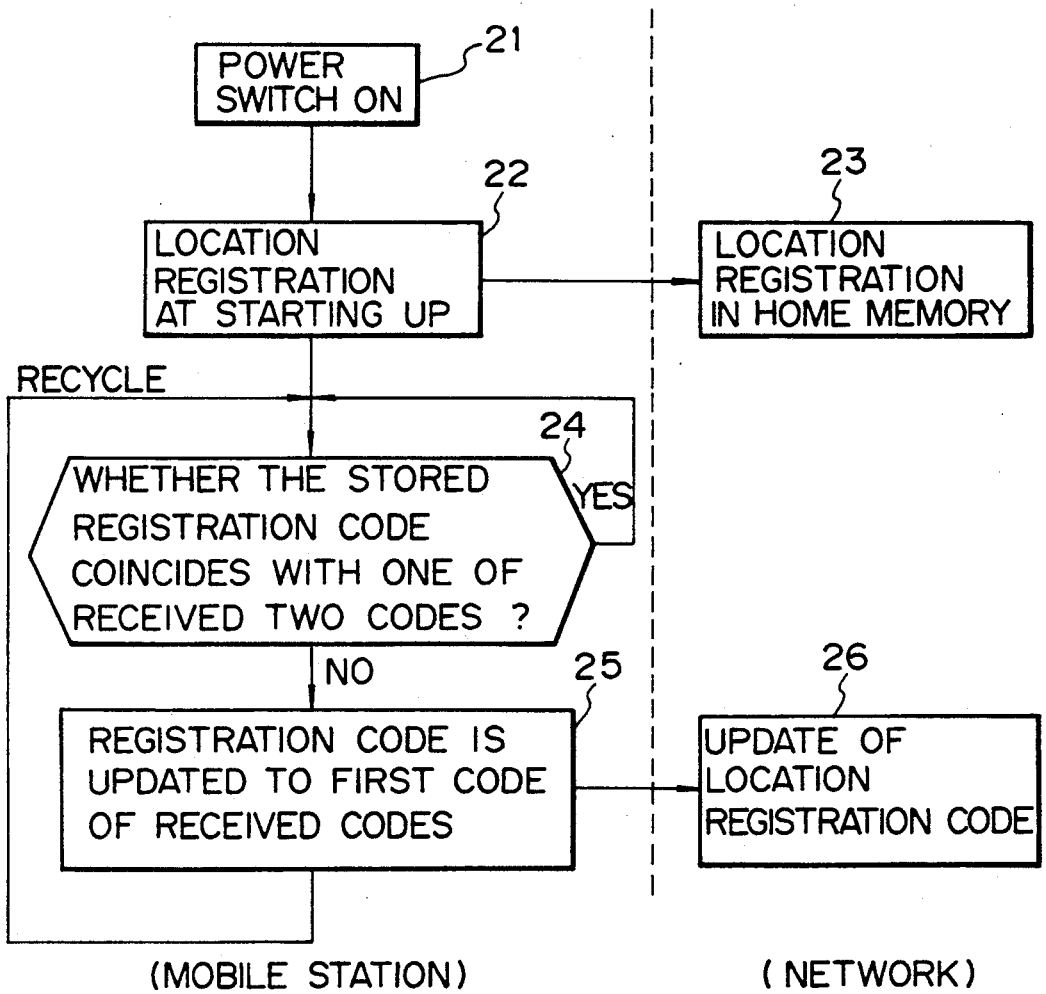
FIG. 3 is a flowchart for explaining the operation of the first embodiment according to the present invention.

Now, the location registration operation of the first embodiment is explained together with FIG. 3. When the mobile station is not yet location-registered such as at the time of power source closing (step 21), the mobile station is location-resistered in the location at its starting up (step 22). Here, the mobile terminal call to be mobile station is effected by a location registration area unit such as L1 and L2. Each base station has broadcast signal for location registration. This broadcast signal is composed of, as information elements, a common information corresponding to a calling zone and a base station information corresponding to a base station, such that, the location registration code assigned as in Table 1 is broadcast as the common information.

The location registration at the time of starting up in the above step 22 is performed by storing in the inside memory of the mobile station the first location registration code out of the two location registration codes in Table 1 contained in the broadcast signals from a radio base station. On the other hand, the above first location registration code is registered in the home memory at the network side (step 23).

Thereafter, the mobile station periodically receives broadcast information, compares the broadcast two location registration codes with the code stored in the memory of the mobile station and judges whether or not the location registration code stored in itself is contained among the two received location registration codes (step 24).

When the one is contained, the above operation is repeated periodically. Contrary, when the stored location registration code is not contained (when the two received location registration codes differ from the one stored in itself), which is caused when the mobile station moves into a new location registration area, the first location registration code among the received location registration codes is selected and stored in the memory of the mobile station (step 25). Further, at the network side the same first location registration code is accordingly rewritten in the home memory (step 26).

Thereafter, the mobile station returns to the operation to periodically check the broadcast signals, in that returns to the step 24. Therefore, in the present embodiment, when a mobile station moves through the aforesaid overlapped location registration areas (an overlapping portion of location registration areas) and both of the received two location registration codes differ from the one location registration code stored in itself, the location registration is effected in the home memory.

Figure 4A:
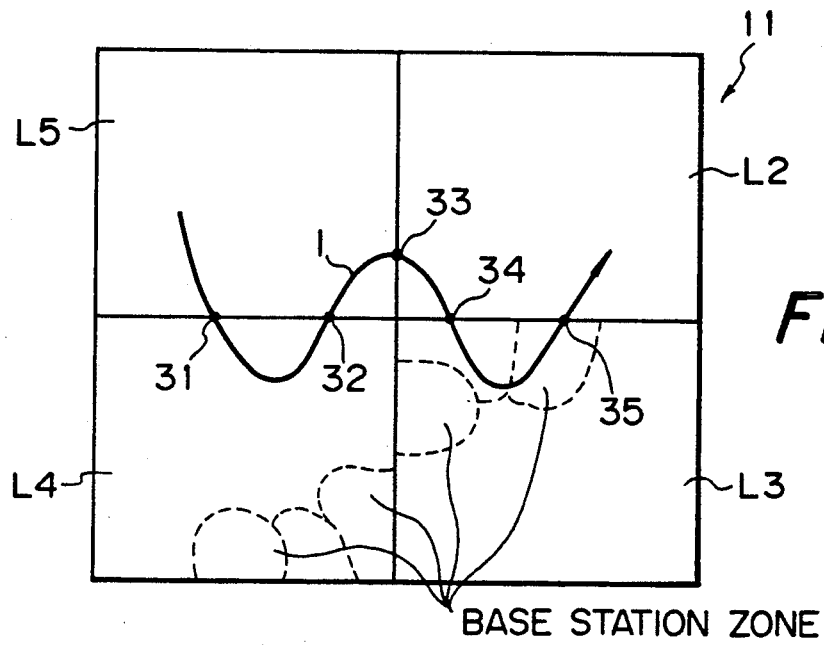
FIGS. 4(a) and 4(b) illustrate points where location registration is carried out in the first embodiment according to the present invention and a convevtional example.

FIG. 4 shows manners of location registration in comparison of the first embodiment according to the present invention and a conventional example. FIG. 4(A) shows location registration points by means of the conventional location registration method wherein the service area 11 is divided into four location registration areas L2–L5. Conventionally when the mobile station moves as indicated by the solid line I in FIG. 4(A), the location registration is effected at area boundary points where the mobile station crosses, in that at 31, 32, 33, 34 and 35.

Figure 4B:
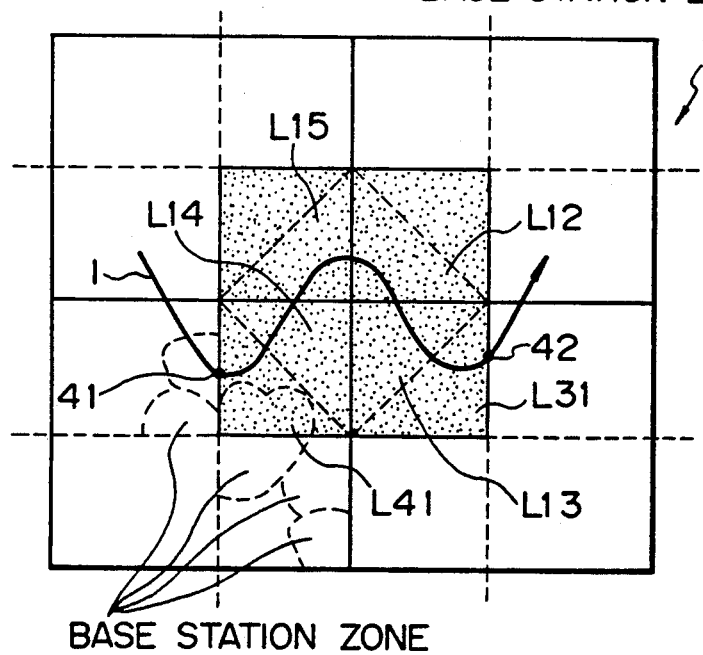

On the other hand, according to the present embodiment, as shown in FIG. 4(B), when the mobile station moves along the same route I as the conventional one, the location registration is effected at points 41 and 42 on the overlapped area boundaries between the location registration area L1 and the other location registration areas L4 and L3, however one of the two location registration codes received within the location registration area L1 is common in L1, no location registration is effected.

Therefore, while conventionally five location registrations were involved, according to the present embodiment the number is decreased to twice, such that the location registration traffic is greatly lowered. Further, in the present embodiment it is unnecessary to include location information in location registration request signals, the location registration traffic is further reduced.

Figure 5:
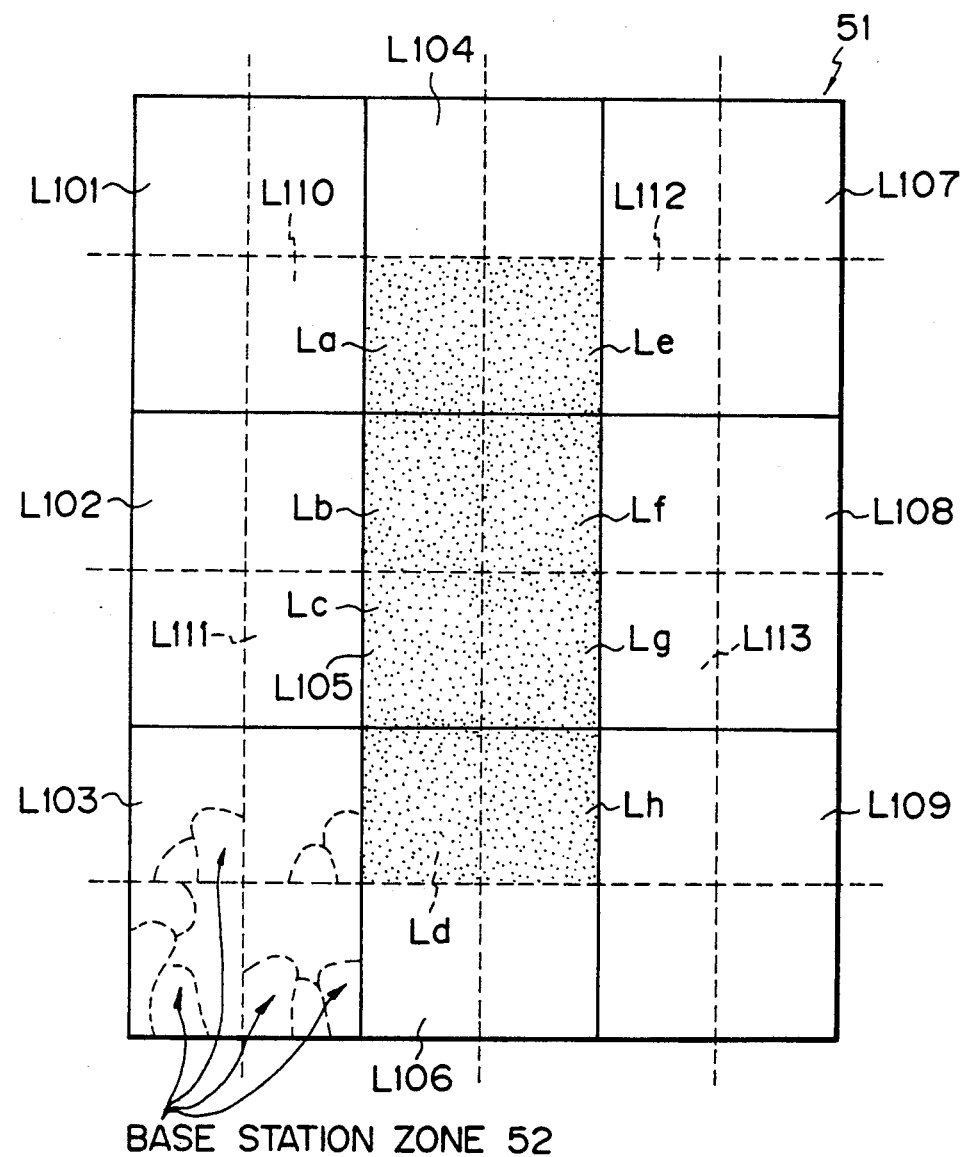
FIG. 5 shows a location registration area of the second embodiment according to the present invention.

Now, the second embodiment of the present invention is explained together with FIG. 5 through FIG. 8. In FIG. 5, 51 is a service area composed of many base station zones 52 of a radio station. The service area 51 is divided in a manner that nine location registration areas L101-L109 and such as location registration areas L110-L113 overlap.

Figure 6A:
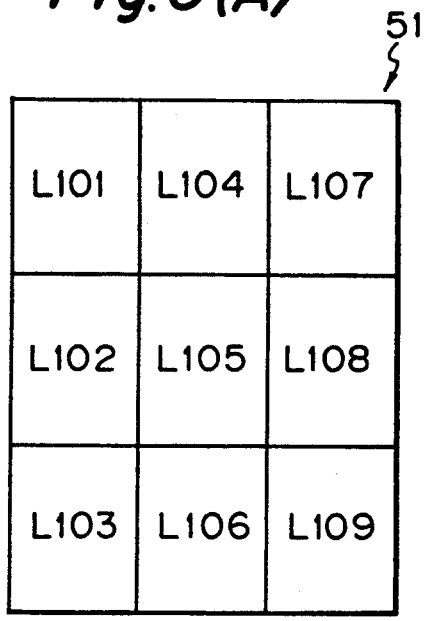
FIGS. 6(a), 6(b), and 6(c) show the location registration area of the second embodiment by divided forms.
Figure 6B:
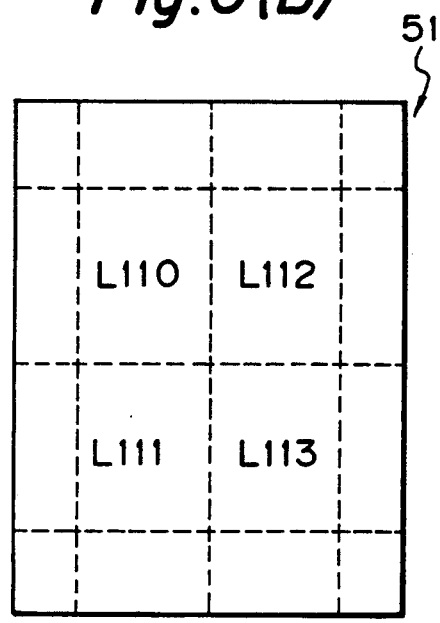
Figure 6C:
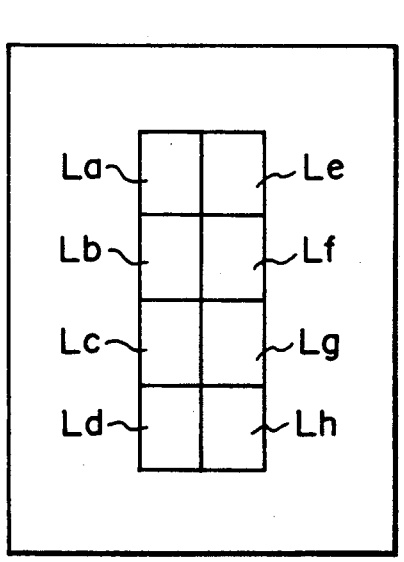

Namely, in the service area 51 the first divided location registration area group in which the service area 51 is divided into nine location registration areas L101-L109 as shown in FIG. 6 (A), and a second divided location registration area group in which the service area 51 is divided into location registration areas L110-L113 having the same size of the respective location registration areas L101-L109 are overlapped with the divide lines shifted. Therefore, each position in the service area 51 is on two overlapped location registration areas, for instance with L104-L106 and L110-L113, eight overlapping location registration areas La-Lh are formed as shown in FIG. 6(C).

In the present embodiment, for respective radio base stations locating in the above overlapping location registration areas La-Lh, two location registration codes as shown in the following Table are assigned.

TABLE 2

| Separated area | Area location code separated by solid and dotted lines | |
|---|---|---|
| | A code | B code |
| La | L 104 | L 110 |
| Lb | L 105 | L 110 |
| Lc | L 105 | L 111 |
| Ld | L 106 | L 111 |
| Le | L 104 | L 112 |
| Lf | L 105 | L 112 |
| Lg | L 105 | L 113 |
| Lh | L 106 | L 113 |

Wherein, A code + B code = location registration code of separated area.

For the convenience of explanation, the location registration codes are shown only for the eight overlapping location registration areas La-Lh, however, in the same manner location registration codes (A code, B code) of overlapped location registration areas are assigned for other overlapped location registration areas.

Figure 7:
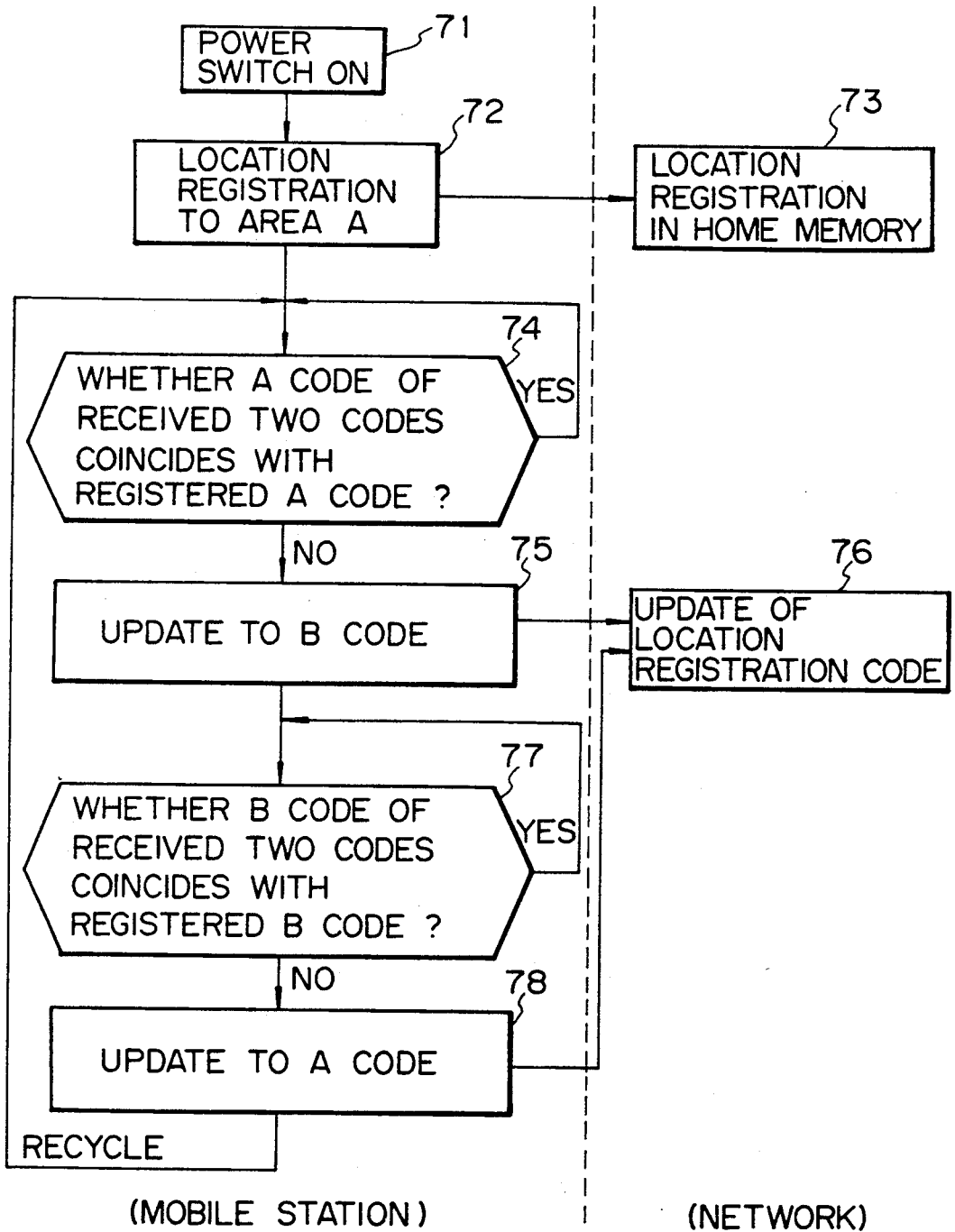
FIG. 7 is a flowchart for explaining the operation of the second embodiment according to the present invention.

Now, location registration operation of the second embodiment is explained together with FIG. 7. When the power switch of a mobile station is closed (step 71), the mobile station registers the location registration area represented by A code in its own memory, and transmits location registration request signals to the network side (step 72). The network side registers the location information in the home memory in which conditions of mobile stations are registered (step 73).

Next, the mobile station periodically receives broadcast signals, compares the A code in the two location registration codes with the A code registered and judges whether or not the both are the same (step 74). When the both are the same, the process returns to the step 74. On the other hand, when the both differ, the mobile station registers B code out of the received two location registration codes into its own memory (step 75), and rewrites the home memory in the network side with this B code (step 76).

Thereafter, the mobile station monitors B code out of the two location registration codes in the broadcast signals periodically received, judges whether or not the B code is the same as the B code stored in itself (step 77), when the both are the same, the process returns to the step 77 again, and when the both differ, registers the A code out of the received two location registration codes (step 78) and stores the same A code in the home memory at the network side (step 76).

As explained above, the mobile station always compares the codes in broadcast signals with the registered code, and when the location registration codes differ, registers to the other code, and returns to the operation in which the broadcast signals are periodically checked.

In the second embodiment, the initial location registration is effected with the A code, however even when the initial location registration is effected with the B code, the operation is the same. Further a method of random selection of the respective codes A and B is possible.

Figure 8A:
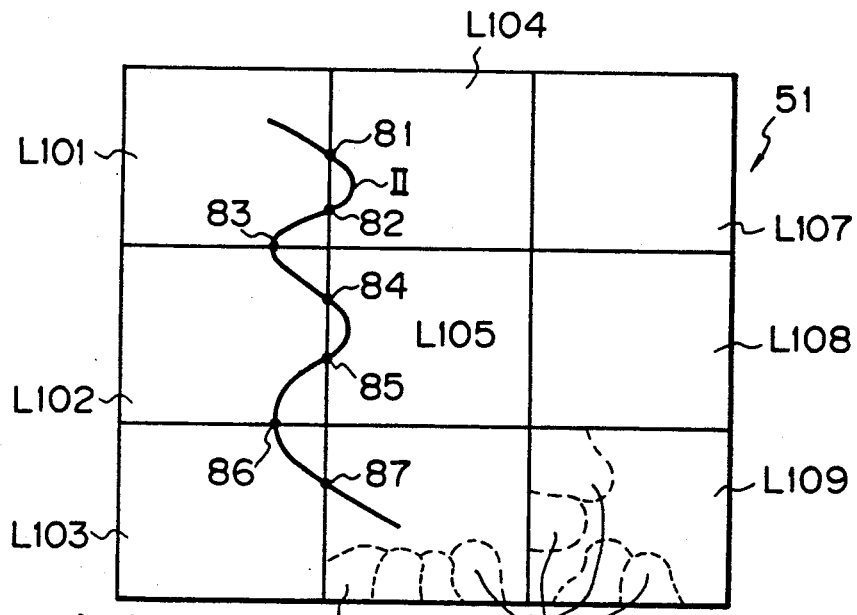
FIGS. 8(a) and 8(b) illustrate points where location registration is carried out in the second embodiment according to the present invention and a conventional example.

Now, the location registration points of the second embodiment according to the present invention and a conventional example is explained togther with FIG. 8. FIG. 8(A) shows location registration points according to the conventional location registration method in which the service area 51 is divided into nine location registration areas L101-L109. Conventionally, when the mobile station moves as indicated by the solid line II in FIG. 8(A), the location registration is effected at every time when the mobile station crosses area boundary points such that the location registration is effected at respective points 81-87 indicated by solid circles in FIG. 8(A).

Figure 8B:
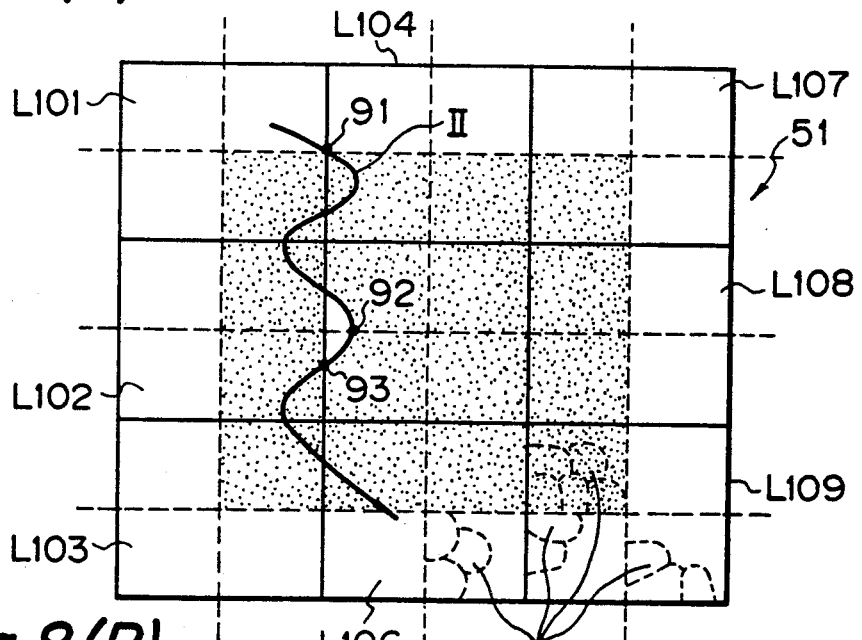
Figure 9:
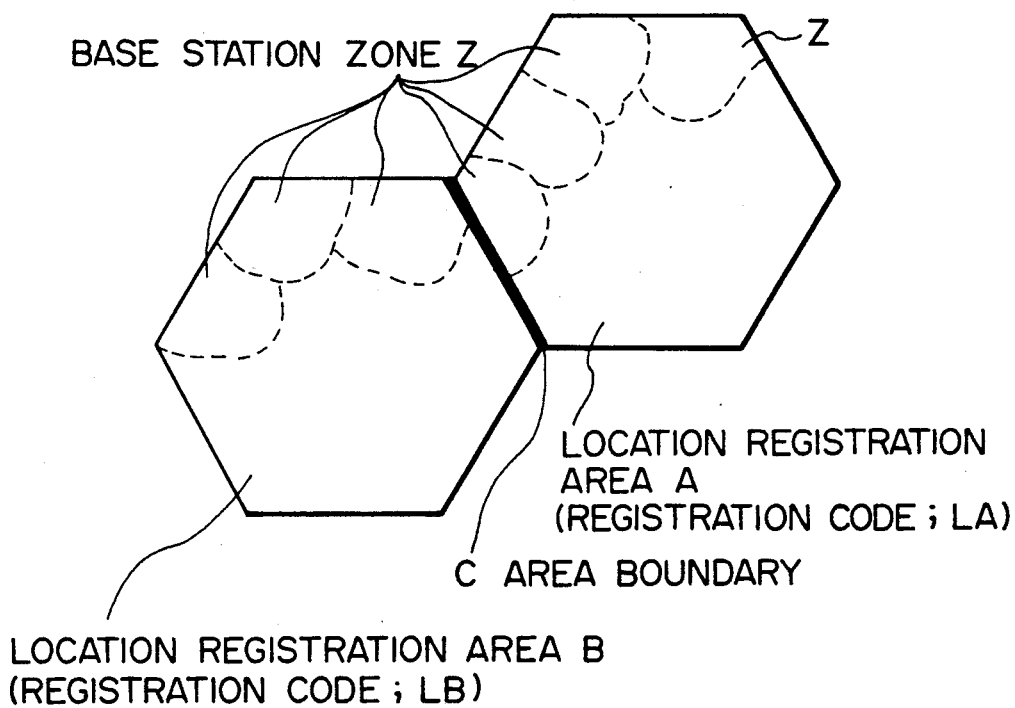
FIG. 9 shows a conventional method.

On the other hand, according to the present embodiment, as shown in FIG. 8(B), when the mobile station moves along the same route II as in the same figure (A), the location registration is effected at points 91-93 indicated by solid circles. Namely, the mobile station passes by the area boundaries in the location registration area of A code between points 91 and 92 in the order of L104-L101-L102-L108, and the location registration of B code is only L110, such that during that interval no location registration is effected.

Therefore, the number of the conventional location registration is seven times, however according to the present embodiment the number is decreased to three times such that the location registration traffic is greatly lowered.

Further, in the first and second embodiments, the respective divided location registration areas L1-L5 and L101-L113 having the same size are shown for the convenience of explanation, however actually these sizes may differ each other.

FIG. 12 is a constitutional example of control signals, (a) shows the control signal transmitted from a base station, (b) the control signal transmitted from a mobile station and (c) details of the broadcast information portion in(a).

The base station transmission signal in the control channels is composed of repetition of a broadcast information portion 51, a paging information portion 52 and other control signal transmission portion 53. The location registration area code paged from the base station is transmitted as a part of the information 51.

The mobile station transmission signal is transmitted with a control signal transmission portion 54 through random access. For instance, the location registration of a mobile station is carried out by transmitting a location registration signal to a base station through the channel.

The signal format of the paging information portion is shown by 55.

Figure 13A:
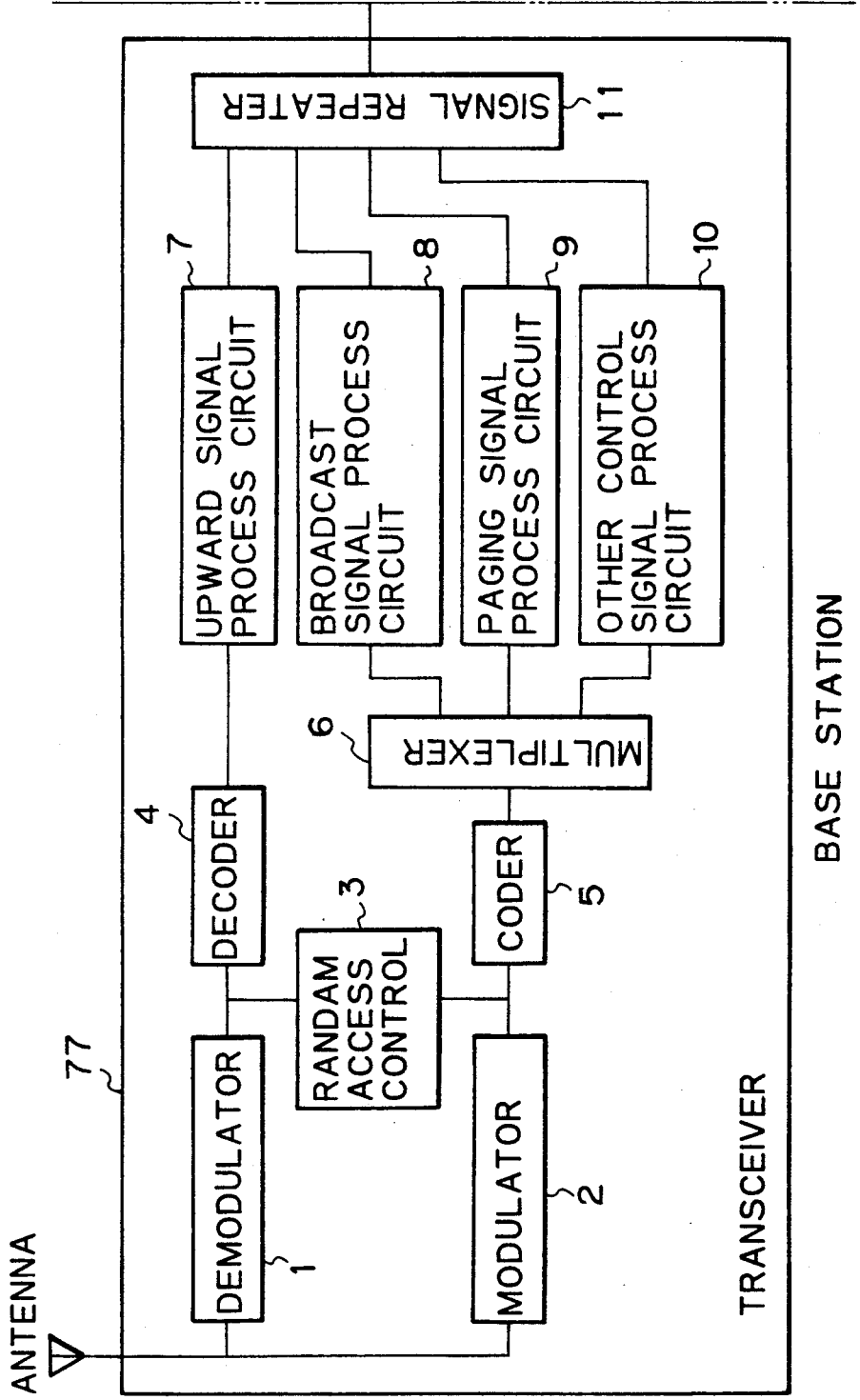
Figure 13B:
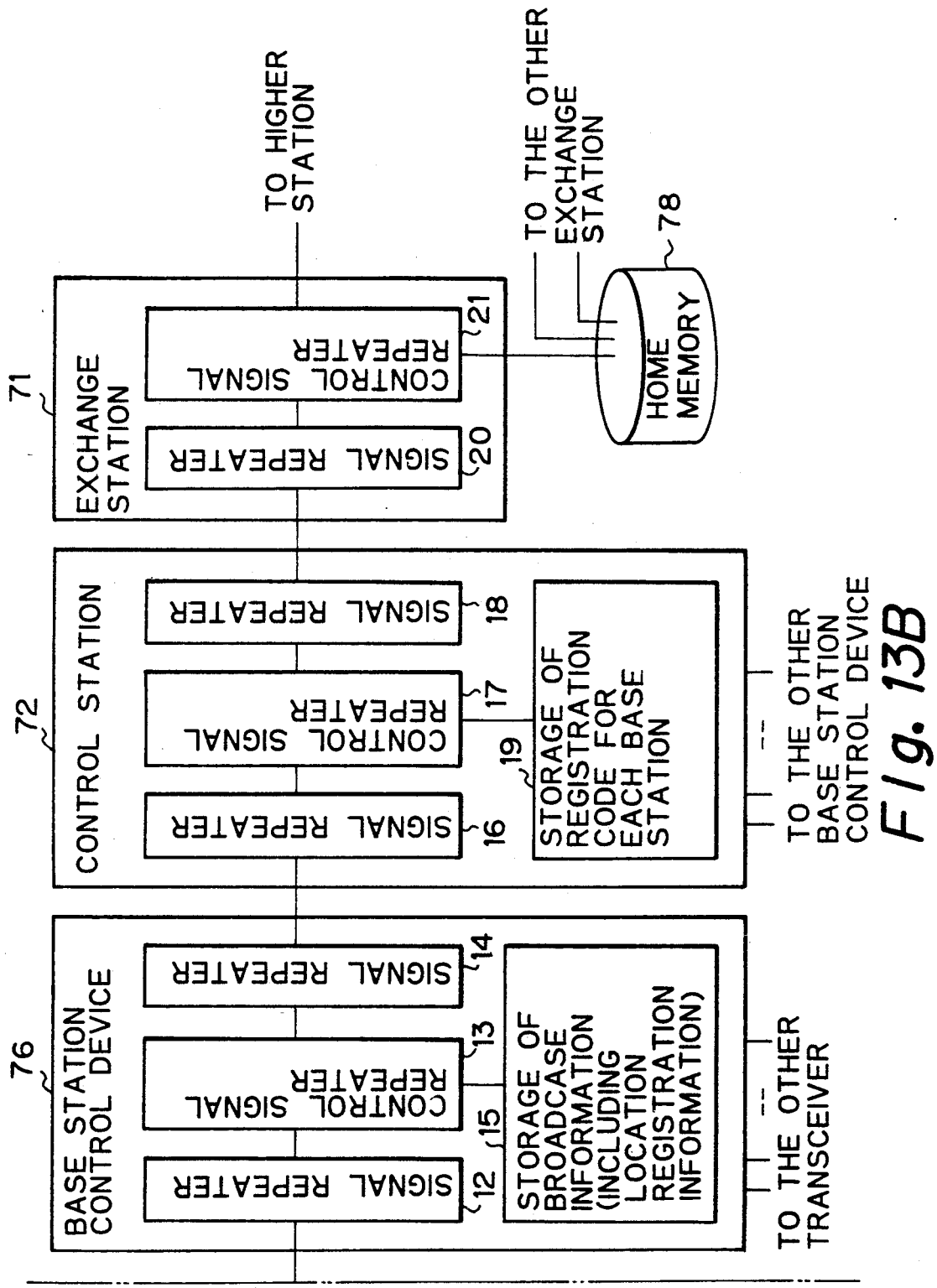

FIG. 13 shows details of the network side in FIG. 10. A control station 72 includes a storage unit 19 storing the relation between the base station and location registration code, to determine a plurality of location registration area codes to which base stations under control belong, and an area when a mobile station registers for each base station. The control station 72 stores time to time these information into a broadcast information storage unit 15 via a control unit 17, a signal transit units 16, 14 and a control unit 13. Thereby in the broadcast information storage unit 15 a plurality of location registration area codes to which the base station belongs and an area code when the mobile station is location-registered are stored.

The control unit 13 of a base station control device 76 reads the broadcast information from the broadcast information storage unit 15, which is transmitted to broadcast a information processing circuit 8 via signal transit units 12, 11 to form a frame and multiplexed in a signal multiplexing circuit 8 together with the output of a paging information processing circuit 9 and the output of other control signal processing circuit 10. The output is such as error-corrected and coded in a coding circuit 5 and, after modulated in a modulation circuit 2 and amplified, transmitted via an antenna.

A random access control circuit 3 is provided for enhancing circuit efficiency by decreasing collision of mobile station transmission signals.

When a mobile station transmission signal is received via an antenna, the siganl is demodulated in a demodulating circuit 1, error-corrected, detected and decoded in a decoding circuit 4, assembled into a signal in an upward direction signal processing circuit 7 and is led to the control unit 13 via the signal repeat units 11, 12. In the control unit 13, when the signal is recognized as a location registration signal based upon signal classification in the signal, the signal is added with a location registration area code as an information element and sent to a control unit 21 via signal repeat units 14, 16, a control unit 17, and signal repeat units 18, 20.

The control unit 21 transfers the information to a home memory 22. In the home memory 22 the subscriber discriminater and location registration area code are renewed.

Figure 14:
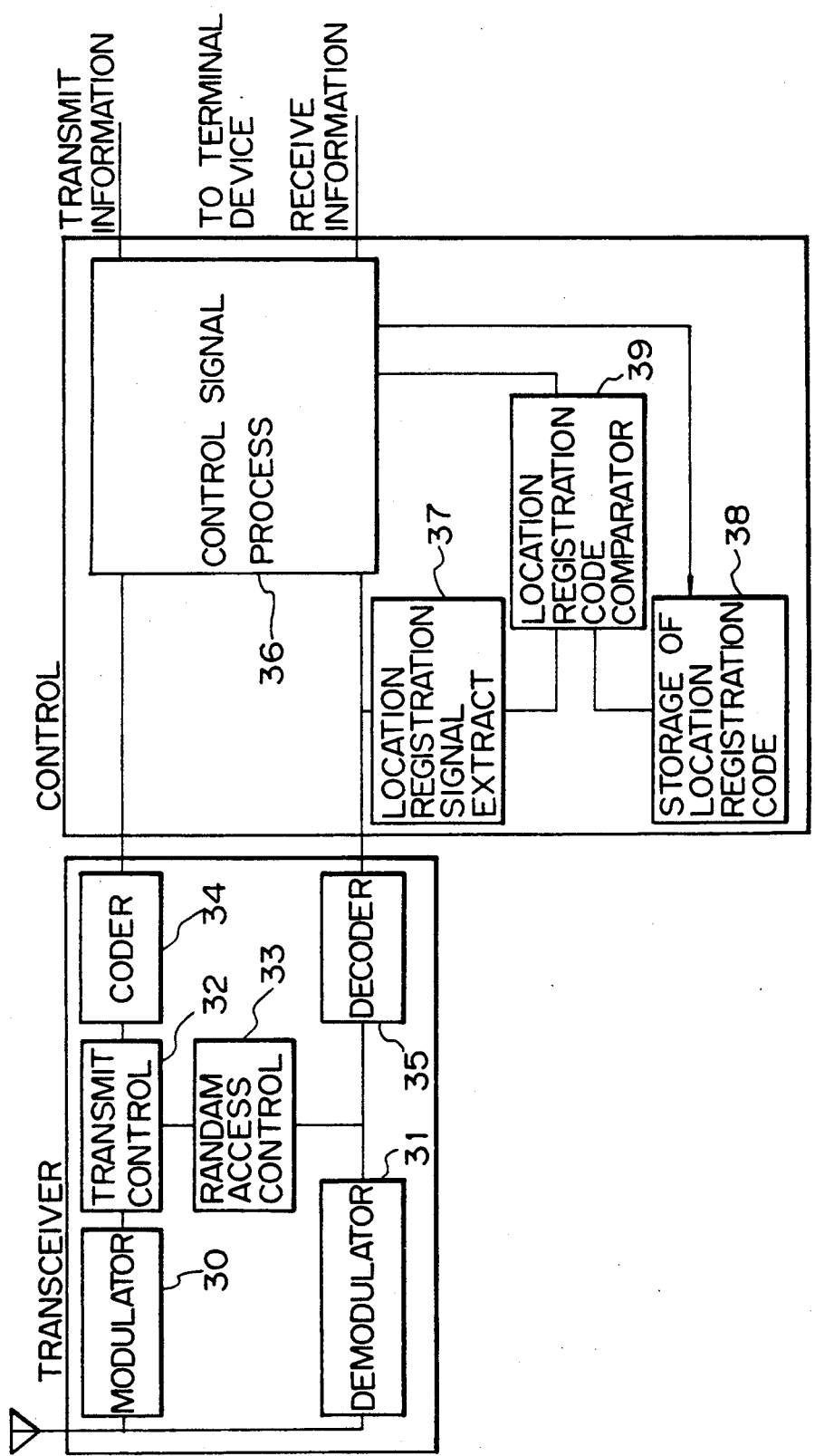

FIG. 14 shows an example of a mobile station, a location registration area code paged or broadcast from a base station is demodulated at a demodulation circuit 31 via an antenna and decoded including error correction or error detection in a decoding circuit 35, and sent to a control unit. In a location registration information extraction circuit 37, a paged location registration area code is extracted and sent to a location registration code comparing unit 39. A location registration code storage circuit 38 stores which location registration area the mobile station now belongs to. The location registration code comparing unit 39 compares whether the code stored in the location registration code storage circuit 38 is included in the paged location registration code. When the code is included, no further processing is proceeded. When not included, such is informed to a control signal processing device 36, which sends out to a transceiver a location registration signal. The signal is processed including such as error correction and coding at a coding circuit 34 and transmitted to the base station via a transmission control circuit 32, a modulation circuit 30 and an antenna.

Further, the control signal processing device 36 writes a location registered area code in the location regisration code storage circuit 38 and renews information.

The transmission control circuit 32 and a random access control circuit 33 are provided for enhancing circuit efficiency by decreasing signal collision of mobile station transmission signals.

As explained above, according to the present invention, by assiging a plurality of location registration codes to an overlapped location registration area, location registration traffic can be decreased, further when a mobile station crosses once a location registration area boundary and a location registration is effected, no more location registration is needed even when the mobile station repeadedly crosses the area boundary, accordingly the location registration traffic near the area boundary is decreased, the location registration traffic within the area is averaged, further because of the decrease of the location registration traffic, originating call request signals and location registration request signals which are transmitted with random access manner through the same upward direction control channel rarely collides, and a throughput of the control channel increases thereby much more subscribers can be accommodated and a control channel is effectively used.

We claim:

1. A mobile communication system comprising:
   a plurality of location registration areas each having a plurality of radio base stations associated therewith for the transmission of location registration area codes for storage in a mobile station wherein:
   some of said radio base stations are associated with a plurality of location registration areas by partial overlap of said location registration areas,
   each radio base station transmits all the registration area codes with which said each radio base station is associated together with the indication of one of said codes as a primary location registration area code,
   the mobile station receives the location registration area codes, and compares said received codes with a previously stored location registration area code so that
   when the previously stored area code in the mobile station coincides with none of the plurality of area codes transmitted by the base station, the registration of area code for the mobile station is updated to said primary location registration area code.

2. A mobile communication system according to claim 1, wherein the selection of said primary location registration area code is performed according to a position of said primary location registration area code in the plurality of location registration area codes.

3. A mobile communication system according to claim 1, wherein the selection of said primary location registration area code is performed according to the predetermined priority of a plurality of location registration areas.

4. A mobile communication system according to claim 1, wherein the primary area code is indicated by duplicate transmission of said primary area code by the base station.

5. A method for registering a mobile station in a mobile communication system in which a service area covered by a plurality of radio base stations is divided into a plurality of location registration areas, location registration codes are assigned to said respective plurality of location registration areas, radio base stations are provided for transmitting said location registration codes to mobile stations for storage in said mobile stations, and the location registration code of the location registration area where said mobile station is located is stored in a home memory in a network, comprising the steps of:

dividing said service area into a plurality of location registration groups each of which includes at least a portion of a plurality of overlapping location registration areas, assigning a plurality of location registration codes corresponding to said overlapping location registration areas to each radio base station located in each of said groups, and, registering the location of each of said mobile stations, based upon a comparison of said plurality of location registration area codes with a location registration area code stored in each mobile station.

6. A mobile station communication system according to claim 1, wherein the primary area code is selected based on the distance between said base station and the center of each of said plurality of location registration areas.

* * * * *